United States Patent
Rang et al.

(10) Patent No.: US 9,729,471 B2
(45) Date of Patent: Aug. 8, 2017

(54) APPARATUS AND METHOD OF OPERATING A NETWORK TRAFFIC POLICING MODULE

(71) Applicant: GE Aviation Systems LLC, Grand Rapids, MI (US)

(72) Inventors: John Raymond Rang, Grand Rapids, MI (US); Pavlo Bobrek, Bradenton, FL (US); Paul Raymond Ahrens, Pinellas Park, FL (US); Todd Davies Schavey, Grand Rapids, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 164 days.

(21) Appl. No.: 14/690,510

(22) Filed: Apr. 20, 2015

(65) Prior Publication Data

US 2016/0308751 A1    Oct. 20, 2016

(51) Int. Cl.
*H04L 12/931* (2013.01)
*H04L 12/40* (2006.01)
*H04L 12/26* (2006.01)

(52) U.S. Cl.
CPC ............ *H04L 49/351* (2013.01); *H04L 43/50* (2013.01); *H04L 43/087* (2013.01); *H04L 2012/4028* (2013.01)

(58) Field of Classification Search
None
See application file for complete search history.

(56) References Cited

U.S. PATENT DOCUMENTS

| 7,929,431 | B2 | 4/2011 | Wilt et al. |
| 8,135,807 | B2 | 3/2012 | Jackson |
| 8,964,555 | B1* | 2/2015 | Miller ............... H04L 12/40136 370/235 |
| 2004/0131073 | A1* | 7/2004 | Hahn .................. H04L 41/0213 370/422 |
| 2006/0075191 | A1* | 4/2006 | Lolayekar ............. G06F 3/0613 711/114 |
| 2007/0130281 | A1 | 6/2007 | Sandell et al. |

(Continued)

FOREIGN PATENT DOCUMENTS

| EP | 2506510 A1 | 10/2012 |
| WO | 02062023 A1 | 8/2002 |

OTHER PUBLICATIONS

Bauer et al., "Worst-Case Backlog Evaluation of Avionics Switched Ethernet Networks with the Trajectory Approach", Real-Time Systems (ECRTS), 2012 24th Euromicro Conference on, IEEE, pp. 78-87, Jul. 11, 2012.

(Continued)

*Primary Examiner* — Chi H Pham
*Assistant Examiner* — Raul Rivas
(74) *Attorney, Agent, or Firm* — GE Global Patent Operation; William S. Munnerlyn (57) ABSTRACT

An apparatus and method of operating a network traffic policing module includes a data ingress port configured to receive data frames transmitted over the network, a data egress port configured to transmit a set of the data frames to the data egress port and a logic device configured to execute a set of compliance tests on the data frames received at the data ingress port and transmits to the data egress port only a set of data frames that are compliant with the set of compliance tests.

18 Claims, 5 Drawing Sheets

(56) References Cited

U.S. PATENT DOCUMENTS

2007/0165663 A1* 7/2007 Aloni .................. H04L 41/12
370/420
2012/0250694 A1* 10/2012 Hall .................. H04L 49/501
370/400

OTHER PUBLICATIONS

European Search Report and Written Opinion issued in connection with corresponding EP Application No. 16165775.4 on Sep. 14, 2016.

* cited by examiner

APPARATUS AND METHOD OF OPERATING A NETWORK TRAFFIC POLICING MODULE

BACKGROUND OF THE INVENTION

For contemporary aircraft, an avionics 'platform' consists of a variety of elements such as sensors, sensor data concentrators, a data communications network, radio frequency sensors and communication equipment, computational elements, effectors, and graphical displays. These components must share information with other components over the data communications network.

Legacy incarnations of these platform elements are in the form of individual subsystem elements often referred to as "federated systems". A federated system is an application-specific subsystem in a self-contained package having its own dedicated logic, processors, and input/output interfaces. Multiple and separated federated systems rely on common subsets of data sources, but lack the sharing of processing resources and interfaces among federated systems.

Previous efforts to reduce the reliance on federated systems, resulted in the introduction of the ARINC 653 and ARINC 664 standards. ARINC 653 (A653) is an operating system in which the application, e.g., associated with a federated system function, is granted its own time slice partition and its own memory space partition in which to execute. This enabled what were multiple federated system functions to be hosted on a common processor and to share a common interface and wiring to an avionics data network based on ARINC 664 part 7 (A664).

In these systems, data is sampled, published, and transmitted at a higher frequency and an application executing in an ARINC 653 partition is run more frequently in order to ensure that the results produced by an application have sufficiently low input-data-sample-time-to-processed-output delay. Both the frequency of data publication rate and the frequency of application execution tend to be more frequent than would be necessary if data and its processing were synchronized.

Network components utilized to construct a data network utilizing a specialized data protocol, including relays, switches, communicative connections, and the like, can be certified under compliance specifications to ensure performance of the network architecture for the specialized data, as for example, under the performance of the network communications defined by the A664 specification. These certified network components are typically more expensive than uncertified or non-compliant network components, and development, maintenance, or updating of certified network components can result in longer time-to-market, at least in part due to the certification process.

BRIEF DESCRIPTION OF THE INVENTION

In one aspect, a network traffic policing module includes a data ingress port configured to connect to a network and to receive data frames transmitted over the network, a data egress port configured to connect to a network switch uncertified for a network protocol and transmit a set of the data frames to the data egress port, a test module having a set of network protocol compliance tests, and a logic device connected to the test module, the data ingress port, and the data egress port, and configured to execute the set of network protocol compliance tests on the data frames received at the data ingress port, and transmit to the data egress port a set of data frames that are compliant with the set of network protocol compliance tests.

In another aspect, a network transmitting data frames and including a network switch uncertified for ARINC 664 networks includes a traffic policing module having a data ingress port connected to the network and a data egress port connected to the network switch, a test module having a set of ARINC 664 compliance tests, and a logic device connected to the test module, the data ingress port, and the data egress port, and configured to execute the set of ARINC 664 compliance tests on the data frames received at the data ingress port on a frame-by-frame basis, and transmit to the network switch via the data egress port, only a set of data frames that are compliant with the set of ARINC 664 compliance tests.

In yet another aspect, a method of operating a network architecture includes receiving, at a data ingress port of a traffic policing module connected to a network, data frames from the network, executing individually, in a logic device in the traffic policing module, a set of network protocol compliance tests on the received data frames, and transmitting to a network switch uncertified for network protocol networks, connected to a data egress port of the traffic policing module, only a set of data frames that are compliant with the set of network protocol compliance tests.

DESCRIPTION OF EMBODIMENTS OF THE INVENTION

The embodiments of the invention described herein are provided with respect to a specialized avionics data protocol, but it will be understood that the apparatus and method described herein can be implemented in any environment using a data communications network interconnecting a set of data-generating components with a set of data-consuming components. Embodiments of the disclosure can include data communications networks configured to operate according to defined network characteristics or specifications. For example, contemporary aircraft operate a set of components interconnected by way of a data network defined by a network standard, such as the ARINC 664 part 7 (A664) specification, incorporated herein in its entirety. The A664 specification defines compliant network operations including, but not limited to, redundancy, dedicated bandwidth, deterministic quality of service, and network switching performance.

Figure 1:
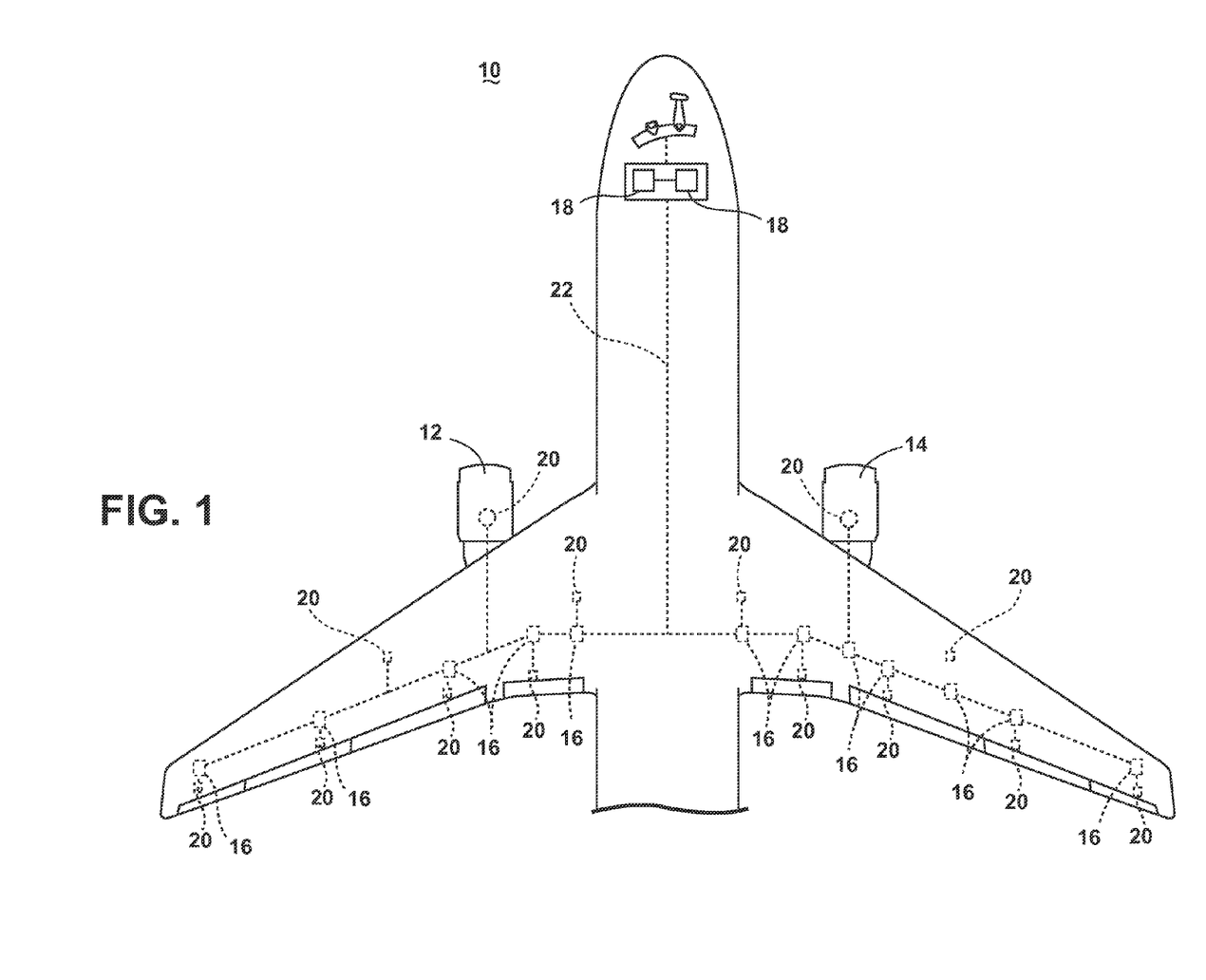
FIG. 1 is a top down schematic view of an example aircraft and avionics data network architecture of an aircraft.

As illustrated in FIG. 1, an aircraft 10 can include at least one propulsion engine, shown as a left engine system 12 and right engine system 14. The aircraft 10 can further include one or more aircraft computers 18, including, but not limited to data storage or processing units, or functional systems such as the flight management system or autopilot system, and a set of fixed aircraft components, such as line-replaceable units (LRU) 20, or modular components of a vehicle or aircraft. In the aircraft environment, the aircraft computers or LRUs 20 can be designed to operate according to a particular operation, interoperability, or form factor standards, such as those defined by ARINC series standards. In the exemplary embodiment illustrated, the aircraft computers 18 can be positioned near the nose or cockpit of the aircraft 10 and the LRUs 20 can be positioned throughout the aircraft 10. The aircraft computers 18 and LRUs 20 can be configured to be communicatively coupled by way of a series of data transmission pathways 22, network relays, or network switches 16. The data transmission pathways 22 can include a physical connection between the respective components 18, 20, such as a wired connection including Ethernet, or can include wireless transmission connections, including, but not limited to, WiFi (e.g. 802.11 networks), Bluetooth, and the like. Collectively, the aircraft computers 18, LRUs 20, pathways 22, and switches 16 can form an avionics data network for the aircraft.

The LRUs 20 can include, for example, entirely contained systems, sensors, radios, or other auxiliary equipment to manage or operate aircraft functions. At least a set of aircraft computers 18 or LRUs 20 can, for example, generate data, which can be modified, computed, or processed prior to, or in preparation for packaging the data into data frames to be transmitted over the avionics data network by way of the pathways 22 or switches 16. At least another set of aircraft computers 18 or LRUs 20 can, for example, consume the data transmitted over the avionics data network. In some instances, a single aircraft computer 18 or LRU 20 can operate to both generate and consume data. As used herein, "consume," "consuming," or "consumption" of data will be understood to include, but is not limited to, performing or executing a computer program, routine, calculation, or process on at least a portion of the data, storing the data in memory, or otherwise making use of at least a portion of the data.

The illustrated aircraft 10 embodiment is merely one non-limiting example of an aircraft 10 that can be used in embodiments of the invention described herein. Particularities of the illustrated aircraft 10 embodiment, including relative size, length, number of engines, type of engines, and location of various components are not germane to the embodiments of the invention, unless otherwise noted.

In some example components, such as the aircraft computers 18 or LRUs 20, the components can be removably fixed to the aircraft for maintenance, diagnostics, or repair purposes, but statically fixed during, for example, flight. Additionally, while aircraft computers 18 and LRUs 20 are described, any data generating or data receiving or consuming components fixed relative to an aircraft can be included as embodiments of the invention as fixed components. For example, systems such as a flight management system, primary flight display, cockpit display system, autopilot, or autoland systems can be considered fixed components, as used herein.

Figure 2:
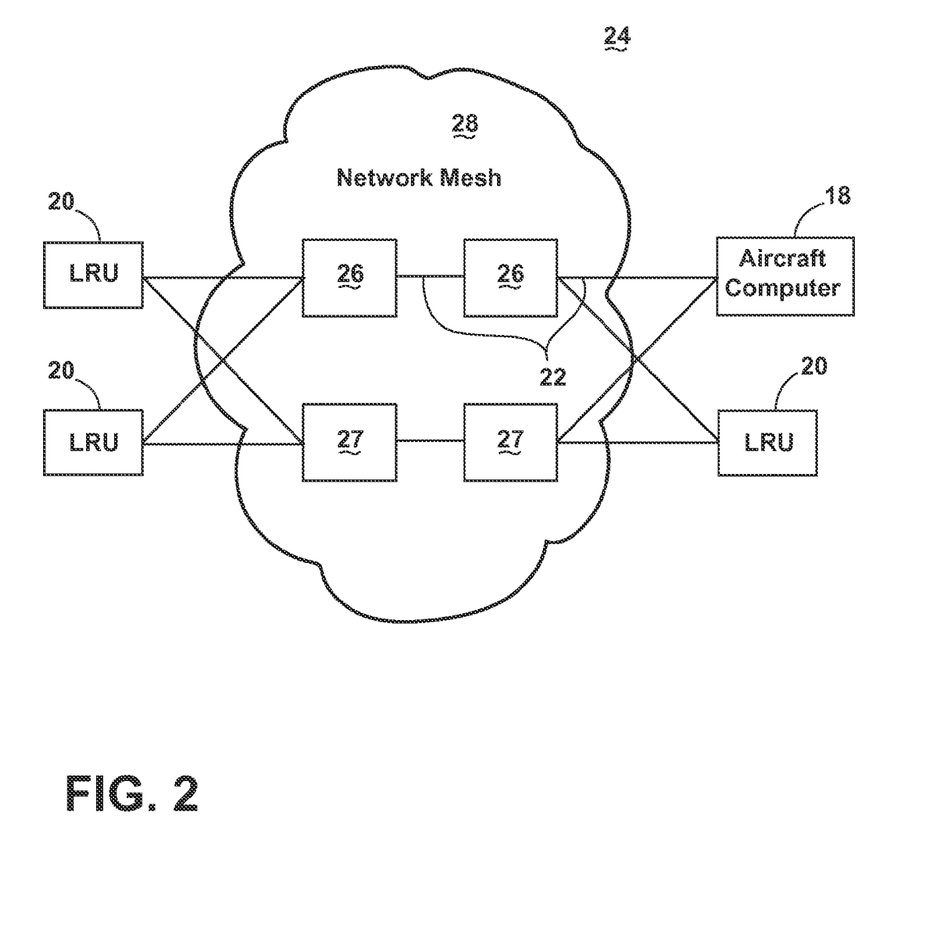
FIG. 2 is a schematic view of an example avionics data network of FIG. 1.

FIG. 2 illustrates a schematic view of an avionics data network 24 in compliance with the A664 specification, according to embodiments of the disclosure. The avionics data network 24 can include, but is not limited to, a set of redundant network switching units, such as a first set of switching units 26 defining a first path and a second set of switching units 27 defining a second, or redundant, path. The first and second switching units 26, 27 collectively define a network mesh 28 for routing the transmission of data frames to and from the aircraft computer 18 and LRUs 20, via the transmission pathways 22. The network mesh 28 is further shown having a set of transmission pathways 22 between the network switching units 26 to provide redundancy in transmission pathways 22. The embodiment of the disclosure illustrated in FIG. 2 is merely one representation of the avionics data network 24, and alternative configurations, organization, and component quantities, including, but not limited to, aircraft computers 18, LRUs 20, or network switching units 26, are envisioned.

Figure 3:
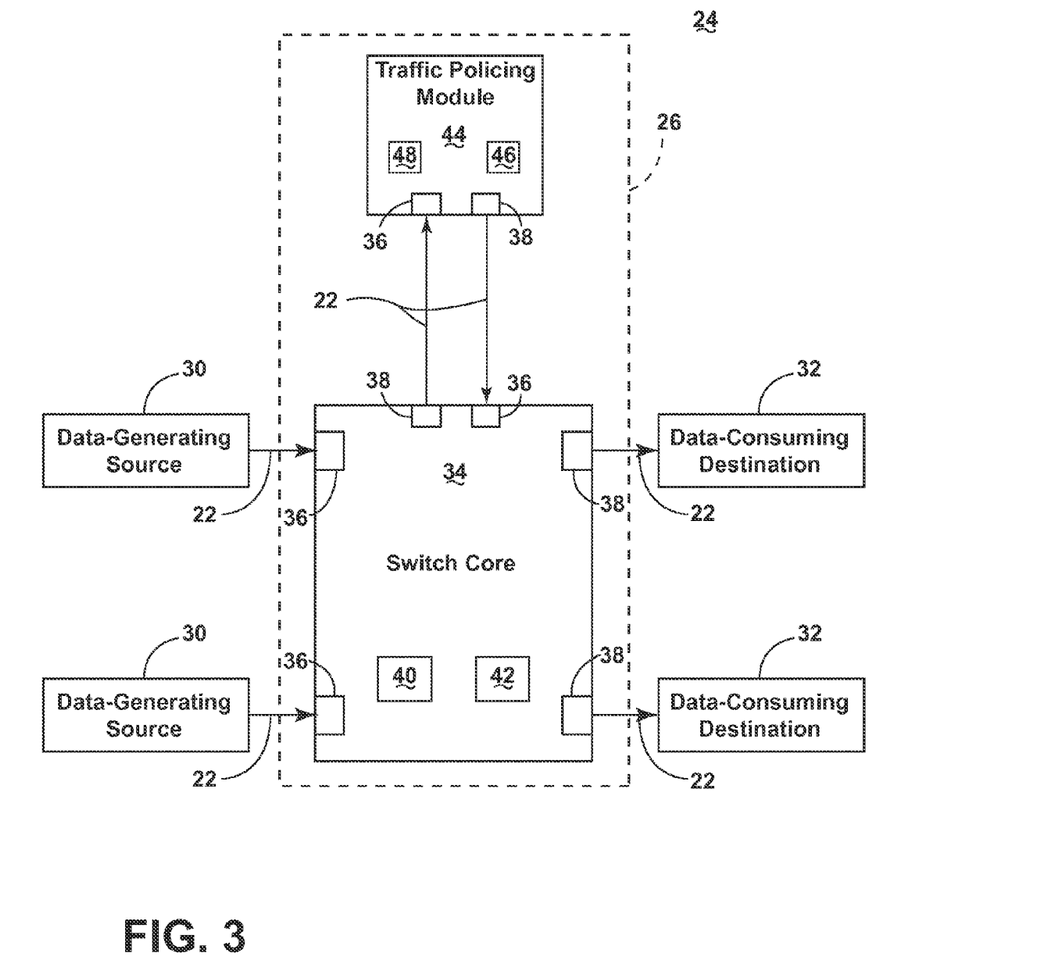
FIG. 3 is a schematic view of a network switch of the avionics data network having a traffic policing module.

Turning now to FIG. 3, a simplified avionics data network 24 is illustrated, wherein a set of data-generating sources 30 are communicatively coupled with a set of data-consuming destinations 32, by way of a single network switching unit 26 via corresponding transmission pathways 22. Only a single network switching unit 26 is illustrated for ease of understanding, and it will be understood that any number of, or subset of the network switching units 26 of the avionics data network 24 can be further configured, as shown. Moreover, as explained above, the data-generating sources 30 or data-consuming destinations 32 can include any of the aforementioned aircraft computers 18 or LRUs 20, and are described herein as sources 30 or destinations 32 to provide a directional description of the data transmission.

The network switching unit 26 can further comprise a switch core 34 having at least one ingress port 36, at least one egress port 38, switching logic 40, and a controller module 42, and a traffic policing module 44 having an ingress port 36, an egress port 38, a test module 46, and a logic device 48. The switch core 34 can be configured to couple with the set of data-generating sources 30 via the transmission pathways 22 received in respective ingress ports 36 of the core 34 and supply data frames generated by the sources 30 to the switch core 34. Likewise, the switch core 34 can be configured to couple with the data-consuming sources 32 via the transmission pathways 22 received in the respective egress ports 38 of the core 34 and send data frames destined for the destinations 32 from the switching core 34. It is understood that the data frames can include at least a portion of data defining the data-generating source 30 of the respective data frame, as well as the predetermined data-consuming destination or destinations 32 of the data frame.

As shown, the switching core 34 provides a respective ingress or egress port 36, 38 for the data-generating source 30 or data-consuming destination 32, however alternative configurations are envisioned. For example, one alternative configuration envisions a single ingress or egress port 36, 38 is configured to couple with a second network switching unit 26, and can thus carry data frames for any data-consuming destination coupled with the second network switching unit 26. In addition to the aforementioned switch core 34 ports 36, 38, the switch core 34 includes an egress port 38 configured to connect with the ingress port 36 of the traffic policing module 44, and an ingress port 36 configured to connect with the egress port 38 of the traffic policing module 44. In this sense, while the switch core 34 can be in, for example, unidirectional communication with the data-generating sources 30 (i.e. only receiving data frames from the source 30) and data-consuming destinations 32 (i.e. only sending data frames to the destination 32), the switch core 34 and the traffic policing module 44 can be in bidirectional communication, sending and receiving data frames between the components 34, 44.

The transmission pathways 22 and ingress or egress ports 36, 38 of the switch core 34 can be defined by the particular pathway 22 utilized, or it can be defined by, for example, the A664 specification. For instance, when the transmission pathway 22 is an Ethernet cord, the set of ingress ports 36 and set of egress ports 38 can include physical interfaces, such as Ethernet ports configured to operate at, for example, 10/100 or Gigabit per second bandwidth speeds. In another instance when the transmission pathway 22 is a wireless transmission, the set of ingress and egress ports 36, 38 can be one or more antennas. Additional or alternative configurations are envisioned.

Conversely, the connection between the switch core 34 and the traffic policing module 44 can be configured to utilize the same or different transmission pathways 22 or ports 36, 38 as those connecting the switch core 34 with the data-generating sources 30 or data-consuming destinations 32. In one non-limiting example, the connection between the switch core 34 and the traffic policing module 44 can be configured to utilize the transmission pathway 22 of an Ethernet cord, but the physical interface ingress and egress ports 36, 38 can be configured to operate at 10 Gigabit per second bandwidth speed, such as under the "X" attachment unit interface (XAUI) Ethernet standard. In additional examples, the physical interface ingress and egress ports 36, 38 can be configured to operate at 40 Gigabit per second, or 100 Gigabit per second bandwidth speed. Moreover, the bidirectional communication between the switch core 34 and traffic policing module 44 can be transmitted by way of a single or combined ingress/egress port 36, 38 and single transmission pathway 22. While a number of transmission pathways 22 and ingress or egress ports 36, 38 are described herein, embodiments of the disclosure are envisioned wherein the utilized pathways 22 or ports 36, 38 are compatible with, or compliant with the A664 specification.

The switching logic 40 and the controller module 42 of the switch core 34 can operate together to route data frames of the core 34, as needed. For example, the controller module 42 can further include a controller and suitable memory for including a portion of a computer program having an executable instruction set for controlling the operation of the controller module 42 or switching logic 40. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc. that have the technical effect of performing particular tasks or implement particular abstract data types. In implementation, the one or more functions or routines of the controller module 42 can be converted to an algorithm, which can be converted to a computer program comprising a set of executable instructions, for execution by the controller or controller module 42.

In one instance, the controller module 42 can determine the predetermined data-consuming destination 32 for a data frame supplied to an ingress port 36 of the switch core 34, based at least partially on the data within the data frame. The controller module 42 can then command the switching logic 40 to route and forward the data frame to the egress port 38 associated with the predetermined data-consuming destination 32 for delivery. In another instance, the controller module 42 can be configured to make a determination if a data frame received at an ingress port 36 is validated, verified, or authorized to arrive from the receiving ingress port 36. When an arriving data frame is received at an invalid, unverified, or unauthorized receiving ingress port 36, the controller module 42 can be configured to command the switching logic 40 to, for example, ignore or drop the data frame without forwarding the data frame on to a destination 32. In this sense, the controller module 42 can be configured to ensure only authorized data frames are transmitted through the avionics data network 24 or network switching unit 26.

In yet another instance, the controller module 42 can be configured to command the switching logic 40 to switch, direct, or forward the data frame traffic received at the one or more ingress ports 36 (after ignoring or dropping any unauthorized data frames, as explained above) to the egress port 38 connected with the traffic policing module 44, for example, by placing the received data frames in a sequential first-in, first-out (FIFO) queue to retain timing or ordering priority. The controller module 42 can then command the switching logic 40 to switch, direct, or forward the data frames returned to the switch core 34 by the traffic policing module 44 to the egress port 38 associated with the predetermined data-consuming destination 32 for delivery.

The test module 46 of the traffic policing module 44 can include a set of compliance tests for data frames according to a transmission or network standard. For example, the test module 46 can include a set of A664 compliance tests, including, but not limited to, the Bandwidth Allocation Gap (BAG) test, the jitter test, or the Maximum Frame Size (Smax) test, which are defined by the A664 specification. Additional tests defined by the A664 specification can be included, and the set of compliance tests is envisioned to include at least those A664 tests to operate a certified network switching unit 26. As similarly described with the controller module 42, the set of compliance tests can be implemented in the test module 46 by way of a computer program including routines, programs, objects, components, data structures, algorithms, etc. that have the technical effect of performing particular tasks or implement particular abstract data types.

The logic device 48 of the traffic policing module 44 can be connected to the test module 46, the ingress port 36 of the traffic policing module 44, the egress port 38 of the traffic policing module 44, and include logic configured to execute the set of compliance tests from the test module 46 on data frames received at the data ingress port 36. The set of compliance tests are executed on the data frames on a frame-by-frame basis, that is, at least a subset of the compliance tests are independently executed on the data frames received by the traffic policing module 44. In instances where the execution of at least the subset of compliance tests on the data frame results in a failure of the at least one compliance test, the logic device 48 is configured to ignore, drop, or refuse to advance the data frame. Stated another way, the logic device 48 is configured to ignore, drop, or refuse to advance any data frame that are uncompliant with at least a subset of the A664 compliance tests.

Only the set of compliant data frames (i.e. data frames that pass the A664 compliance tests), are in turn transmitted to the data egress port 38 of the traffic policing module 44 for delivery to the switch core 34, for delivering to the data-consuming destination or destinations 32. The execution of the set of compliance tests on the data frames occurs in the sequential order of the data frames arriving at the ingress port 36, that is, on a FIFO basis. Examples of the logic device 48 can include, but are not limited to, a controller or processor, a field-programmable gate array (FPGA), or an application-specific integrated circuit (ASIC)

During operation of embodiments of the disclosure, data frames generated by data-generating sources 30 are delivered to the avionics data network 24 by way of transmission pathways 22. The data frames are transmitted to a network switching unit 26, wherein the data frames are ultimately received at the data ingress port 36 of the traffic policing module 44. The traffic policing module 44 operates such that the logic device 48 executes the set of compliance tests in the test module 46 on the data frames (on a frame-by-frame and FIFO basis) received by the traffic policing module 44. The traffic policing module 44 then transmits, via the egress port 38, only the set of data frames that are compliant with the set of A664 compliance tests to the switch core 34, wherein the controller module 42 and switching logic 40 operate together to deliver the data frames to the respective predetermined data-consuming destination or destinations 32.

As described, the traffic policing module 44 ensures the A664 compliance of data frames to operate a certified network switching unit 26. In this sense, an "off the shelf" switch core 34 that is otherwise uncertified, non-compliant, or incompatible with the A664 specification can be selected and implemented in a A664-compliant avionics data network 24 when coupled with the traffic policing module 44 described herein. In this sense, the traffic policing module 44 renders the uncertified, non-compliant, or incompatible switch core 34 compliant with A664 switching specifications.

Embodiments of the disclosure can include configurations wherein, for example, the traffic policing module 44 receives the data frames transmitted over the avionics data network 24 by way of the switch core 34 forwarding the data frames received (as described above). Conversely, embodiments of the disclosure can include configurations wherein, for example, the traffic policing module 44 directly receives data frames transmitted over the avionics data network 24 from data-generating sources 30, or from another component that receives the data frames transmitted over the network 24 and provides the data frames sequentially to the traffic policing module 44.

Moreover, additional embodiments of the disclosure can also include configurations wherein the transmission pathway 22 between the traffic policing module 44 and the switch core 34 operates at a transmission rate fast enough to prevent a bottleneck of the transmission of the compliant data frames of the avionics data network 24 from the data-generating sources 30 to the data-consuming destinations 32. Yet other embodiments of the disclosure can also include configurations wherein at least one of the traffic policing module 44 or logic device 48 is configured to execute the set of compliance tests on the data frames at an execution rate fast enough to prevent a bottleneck of the transmission of the compliant data frames of the avionics data network 24 from the data-generating sources 30 to the data-consuming destinations 32. In any such configurations, the inclusion of the traffic policing module 44 should not render the network switching unit 26 non-compliant with A664 specifications.

Figure 4:
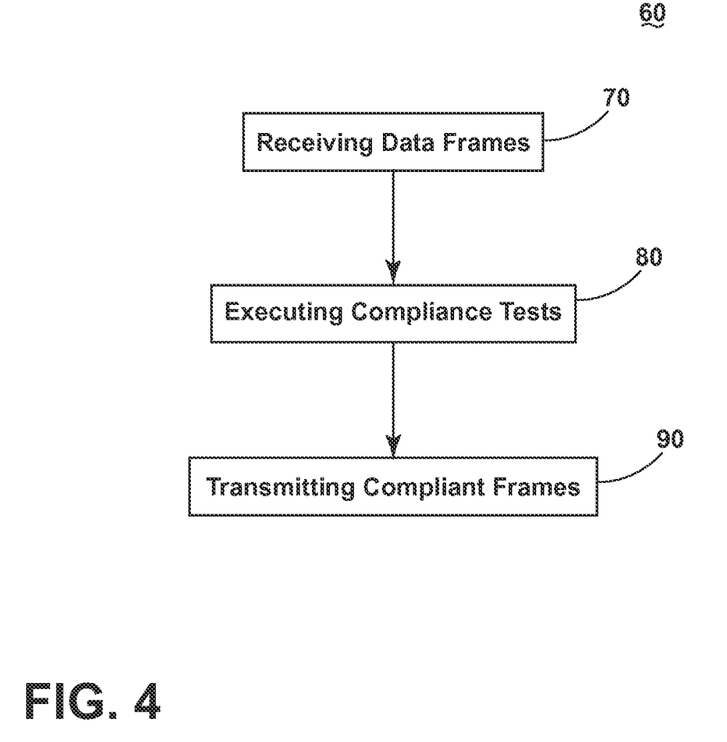
FIG. 4 is a flow chart showing a method of operating the avionics data network having a traffic policing module.

FIG. 4 illustrates an exemplary method 60 for operating the avionics data network 24 architecture described herein. First, a receiving data frames step 70 occurs by receiving, at a data ingress port 36 of the traffic policing module 44 connected to the avionic data network 24, data frames from the network 24. Next, in an executing compliance tests step 80 includes executing in a logic device 48 in the traffic policing module 44, on a frame-by-frame basis, a set of A664 compliance tests on the received data frames. Any frames that do not comply with the policing specifications shall be rejected. Following the executing step 80, a transmitting compliant data frames step 90 includes transmitting to a network switch core 34 uncertified for A664 networks, connected to a data egress port 38 of the traffic policing module 44, only a set of data frames that are compliant with the set of A664 compliance tests.

The sequence depicted is for illustrative purposes only and is not meant to limit the method 60 in any way as it is understood that the portions of the method can proceed in a different logical order, additional or intervening portions can be included, or described portions of the method can be divided into multiple portions, or described portions of the method can be omitted without detracting from the described method. For example, the method 60 can perform additional steps including, but not limited to, executing the set of A664 compliance tests on the received data frames at an execution rate faster than the receiving of the data frames, dropping data frames that are not compliant with at least a subset of the compliance policing tests, or wherein the executing further includes executing a set of A664 compliance tests including at least one of the BAG test, the jitter test, or the Smax test, as defined by the A664 specification.

Figure 5:
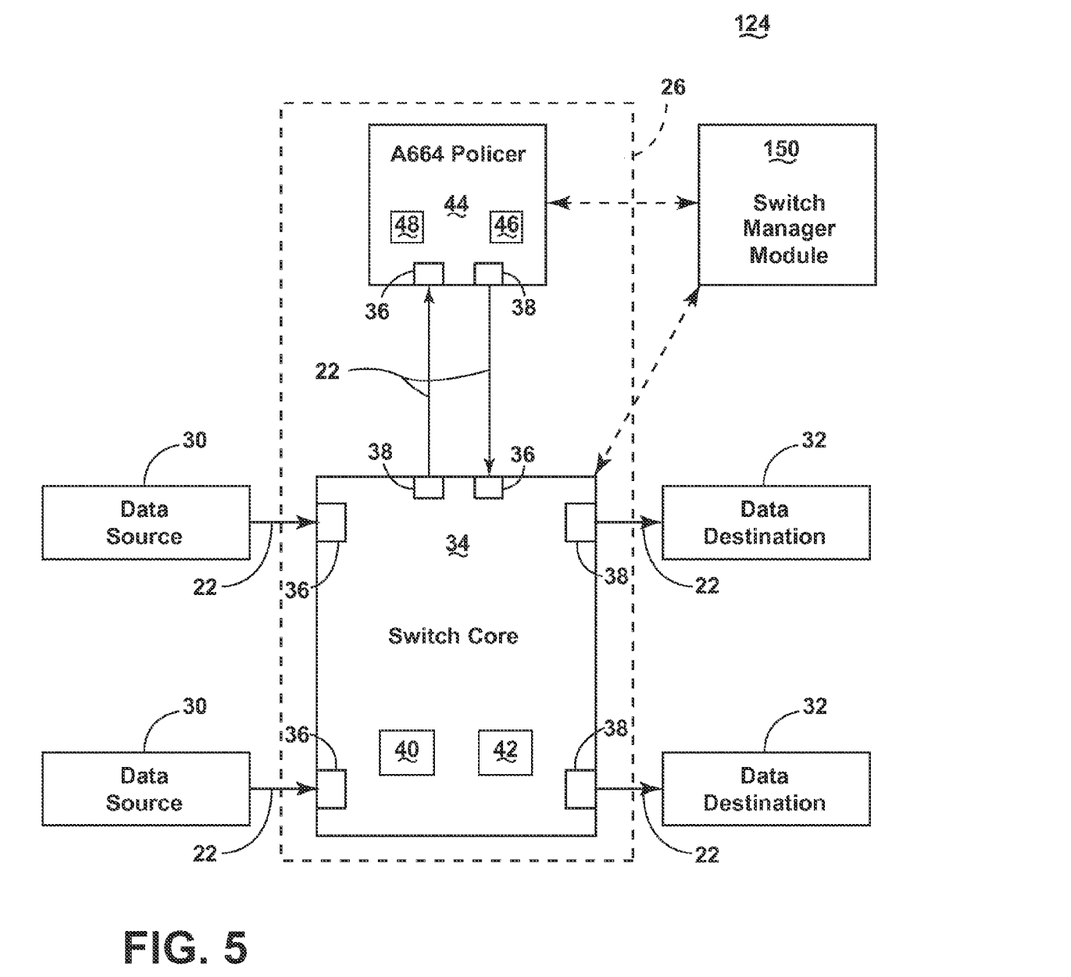
FIG. 5 is a schematic view of an alternative network switch of the avionics data network having a traffic policing module and a switch management module.

FIG. 5 illustrates an alternative avionics data network 124 according to a second embodiment of the disclosure. The second embodiment is similar to the first embodiment; therefore, like parts will be identified with like numerals increased by 100, with it being understood that the description of the like parts of the first embodiment applies to the second embodiment, unless otherwise noted. A difference between the first embodiment and the second embodiment is that the avionics data network 124 can further include a switch manager module 150 having the set of A664 compliance tests and configured to connect with at least one of the traffic policing module 44, test module 46, or logic device 48. The switch manager module 150 can be configured to store the set of A664 compliance tests in a memory, and further configured to download, transmit, or program the A664 compliance tests to the at least one of the traffic policing module 44, test module 46, or logic device 48, in non-limiting examples, during hardware initialization, or in the event of component failure or error. In this sense, the at least one of the traffic policing module 44, test module 46, or logic device 48 can be programmable, or reprogrammable, based on the switch manager module 150.

The switch manager module 150 can have a set of switch core 34 instructions and be further configured to connect with at least one of the switch core 34, switching logic 40, or controller module 42. The switch manager module 150 can be configured to download, transmit, or program the switch core 34 instructions to the at least one of the switch core 34, switching logic 40, or controller module 42, in non-limiting examples, during hardware initialization, or in the event of component failure or error.

The second embodiment of the disclosure can provide for an alternative programming method of the traffic policing module 44 or the switch core 34 such that the module 44 or core 34 can be "hardware locked" or "certification locked" in hardware, and provide for changes, improvements, or updates to respective code, tests, or instructions, without having to recertify the components for the change, improvement, or update, respectively. Embodiments of the disclosure can include the switch management module 150 configured to connected with one or more traffic policing modules 44, one or more network switching units 26, or one or more switch cores 34. Additionally, embodiments of the disclosure are envisioned wherein the switch management module 150 is part of the traffic policing module 44, the switch core 34, or the network switching unit 26.

Many other possible embodiments and configurations in addition to that shown in the above figures are contemplated by the present disclosure. For example, one embodiment of the invention contemplates a single traffic policing module 44 configured to render A664 certification to a set of network switching cores 34. In such an embodiment, the data frames for the respective switching core 34 are routed through the traffic policing module 44 for executing of the set of A664 compliance tests, and compliant data frames are delivered to the respective or predetermined switching core 34 for switching or delivery to the predetermined data-consuming destination 32. In another embodiment, the traffic policing module 44 or the switch manager module 150 can further include support for port mirroring, debugging, flight test protocols, built in test (BIT) protocols, performance monitoring, or reporting functions. In yet another embodiment, ingress ports 36 or egress ports 38, as described herein, can provide for optical interfaces that, for example, can support equally fast or faster bandwidth speeds. Additionally, the design and placement of the various components can be rearranged such that a number of different in-line configurations could be realized. Furthermore, while embodiments of the disclosure describe executing steps, processing steps, and the like on at least a subset of the data frames, embodiments of the disclosure envision such steps wherein the data of the data frames remains unchanged or unmodified regardless of the operation of the steps.

The embodiments disclosed herein provide an apparatus and method for operating a traffic policing module in an avionics data network. The technical effect is that the above described embodiments enable the operation of a certified or certifiable A664 network switch. One advantage that can be realized in the above embodiments is that the above-described embodiments enable the use of commercial off-the-shelf components that are otherwise uncertified under A664 specifications, because the A664 certified policing is implemented in the traffic policing module. Commercial off-the-shelf components are typically less expensive than their certified equivalents, resulting in the configuration of a less expensive A664-compliant data network. Another advantage of the above-described embodiments is that the traffic policing module can implement the execution of the A664 compliance tests using a number of logic devices, and not necessarily having to rely on a tailored or custom ASIC switch product, reducing or eliminating development efforts related to the customization of the ASIC switch product.

Yet another advantage of the above-described embodiments is that the traffic policing module can be quickly developed for by utilizing similar core hardware components that can be "locked in" for certification purposes, and developing, improving, or updating code by way of the switch management module, such that the code can be independently certified without having to recertify the respective hardware associated with the updates. This reduces development cycles for the traffic policing module, the network switching unit, and the avionics data network as a whole, and thus improves the time to market of the embodiments of the disclosure.

To the extent not already described, the different features and structures of the various embodiments can be used in combination with others as desired. That one feature cannot be illustrated in the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An avionics data network comprising:
    a network switch core uncertified for ARINC networks; and
    a traffic policing module, comprising:
        a data ingress port configured to connect to the network switch core and to receive all data frames received by the network switch core;
        a data egress port configured to connect to the network switch core and transmit a set of the data frames to the data egress port;
        a test module having a set of network protocol compliance tests; and
        a processor connected to the test module, the data ingress port, and the data egress port, and configured to execute the set of network protocol compliance tests on the data frames received at the data ingress port, and transmit to the data egress port a set of data frames that are compliant with the set of network protocol compliance tests;
    wherein the traffic policing module operations are configured to render the network switch core complaint with ARINC networks.

2. The avionics data network of claim 1 wherein the data ingress port and the data egress port further include physical interfaces.

3. The avionics data network of claim 2 wherein physical interfaces are Ethernet ports.

4. The avionics data network of claim 1 wherein at least one of the data ingress port or the data egress port further include a 10 Gigabit-per-second communicative coupling.

5. The avionics data network of claim 1 wherein the processor is configured to drop data frames that are uncompliant with at least a subset of network protocol compliance tests.

6. The avionics data network of claim 1 wherein the processor executes the set of network protocol compliance tests on the data frames received at the data ingress port on a first-in, first-out basis.

7. The avionics data network of claim 1 wherein the processor further includes a field-programmable gate array.

8. The avionics data network of claim 1 wherein the traffic policing module further comprises switch manager module having the set of network protocol compliance tests and configured to connect with at least one of the test module or processor.

9. The avionics data network of claim 8, wherein the switch manager module is configured to program the test module with the set of network protocol compliance tests.

10. The avionics data network of claim 1 wherein the ARINC network is ARINC 664.

11. The avionics data network of claim 1 wherein the set of network protocol compliance tests include at least one of the Bandwidth Allocation Gap (BAG) test, the jitter test, or the Maximum Frame Size (Smax) test.

12. A network, comprising:
a network switch core uncertified for ARINC networks, configured to receive data frames from an ARINC network;
a traffic policing module, apart from the network switch core, and having a data ingress port connected to the network switch core and a data egress port connected to the network switch core;
a test module having a set of ARINC 664 compliance tests; and
a processor connected to the test module, the data ingress port, and the data egress port, and configured to execute the set of ARINC 664 compliance tests on the data frames received at the network switch core and provided to the data ingress port, on a frame-by-frame basis, and transmit to the network switch core, via the data egress port, only a set of data frames that are compliant with the set of ARINC 664 compliance tests.

13. The network of claim 12 wherein the network switch core further comprises a set of network core data ingress ports and a set of network core data egress ports configured to connect to a set of network switches, and wherein only the set of data frames that are compliant with the set of SRINC 664 compliance test are transmitted to the predetermined network switch destination by way of the set of network core data egress ports.

14. The network of claim 12 wherein the data ingress port is further configured to receive all data frames transmitted over the network to the set of network core data ingress ports.

15. A method of operating a network architecture comprising:
receiving, at a set of data ingress ports for a network switch core uncertified for ARINC networks, a set of data frames from an ARINC network;
transmitting all the set of data frames to a data ingress port of a traffic policing module connected to the network switch core;
executing individually, in a processor in the traffic policing module, a set of ARINC network protocol compliance tests on the received data frames; and
transmitting to the network switch core, connected to a data egress port of the traffic policing module, only a set of data frames that are compliant with the set of ARINC network protocol compliance tests.

16. The method of claim 15 wherein the executing further includes executing the set of ARINC network protocol compliance tests on the received data frames at an execution rate faster than the receiving of data frames.

17. The method of claim 15 further including dropping data frames that are not compliant with at least a subset of the ARINC compliance policing tests.

18. The method of claim 15 wherein the executing further includes executing a set of ARINC network protocol compliance tests including at least one of the BAG test, the jitter test, or the Smax test.

* * * * *